United States Patent
Fujimura et al.

[15] 3,636,441
[45] Jan. 18, 1972

[54] METHOD OF MEASURING CRACK DEPTHS IN ELECTRICALLY CONDUCTIVE METAL WORKPIECES USING CURRENT PROBES WITH VOLTAGE PROBES LOCATED BETWEEN CURRENT PROBES BY MEASURING THE MINIMUM POTENTIAL DIFFERENCE BETWEEN THE VOLTAGE AND CURRENT PROBES

[72] Inventors: Tsutomu Fujimura, Naka-gun; Hiroshi Kamata, Mito; Tomio Yamaguchi, Kobe; Hisanobu Fukue, Kakogawa, all of Japan

[73] Assignees: Mitsubishi Jukogyo Kabushiki Kaisha, Tokyo, Japan; Japan Atomic Energy Research Institute, Tokyo, Japan

[22] Filed: Feb. 19, 1970

[21] Appl. No.: 12,607

[30] Foreign Application Priority Data

Feb. 22, 1969 Japan..................................44/13065
Nov. 15, 1968 Japan..................................43/83391
Dec. 25, 1968 Japan..................................43/95767
Feb. 10, 1969 Japan..................................44/9258
Feb. 28, 1969 Japan..................................44/14559

[52] U.S. Cl. ........................................324/64, 324/37
[51] Int. Cl. .................................................G01r 27/14
[58] Field of Search ..............................324/64, 65, 37

[56] References Cited

UNITED STATES PATENTS

| | | | |
|---|---|---|---|
| 1,719,786 | 7/1929 | Schlumberger | 324/64 X |
| 1,804,380 | 5/1931 | Sperry | 324/37 X |
| 1,820,505 | 8/1931 | Sperry | 324/37 |
| 2,133,725 | 10/1938 | Sperry, Jr. et al. | 324/64 |

*Primary Examiner*—Herman Karl Saalbach
*Assistant Examiner*—Wm. H. Punter
*Attorney*—McGlew and Toren

[57] ABSTRACT

A method for determining in a nondestructive manner the existence, the depth and the length of cracks in an electrically conductive metal workpiece such as a steel plate or a steel pipe, by means of an electric resistance measurement which is carried out by using a pair of current probes and a pair of voltage probes located between the current probes, and, if a defect is located between the current probes and the voltage probes, the measurement is made on the basis of the minimum potential difference detected by the voltage probes rather than by the maximum value in the measured voltage distribution.

1 Claims, 5 Drawing Figures

INVENTORS
TSUTOMU FUJIMURA
HIROSHI KAMATA
TOMIO YAMAGUCHI
HISANOBU FUKUE by
McGlew & Toren
ATTORNEYS

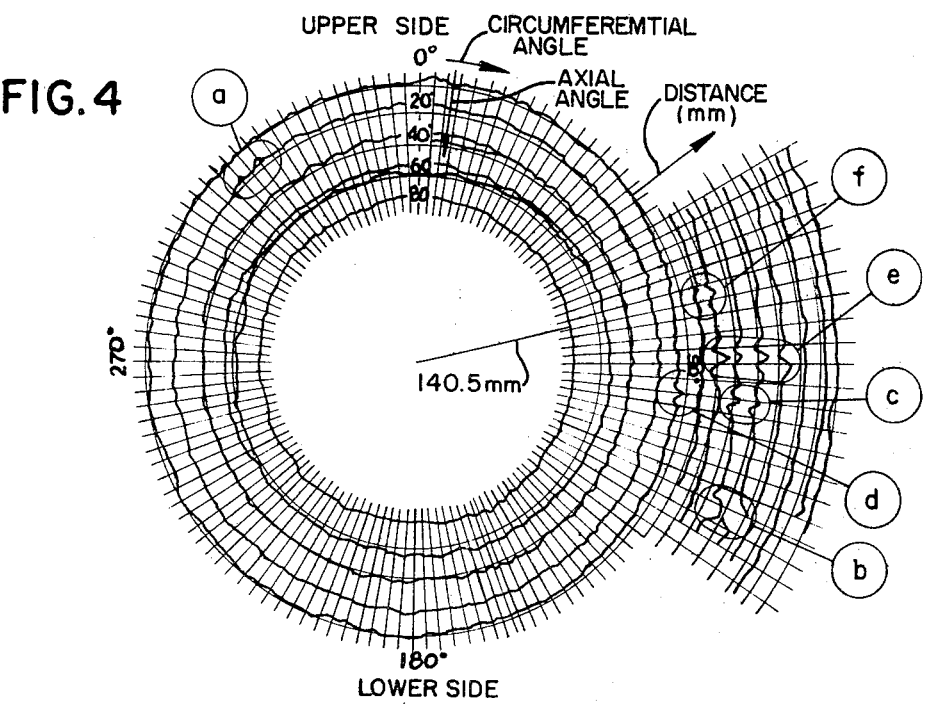

METHOD OF MEASURING CRACK DEPTHS IN ELECTRICALLY CONDUCTIVE METAL WORKPIECES USING CURRENT PROBES WITH VOLTAGE PROBES LOCATED BETWEEN CURRENT PROBES BY MEASURING THE MINIMUM POTENTIAL DIFFERENCE BETWEEN THE VOLTAGE AND CURRENT PROBES

SUMMARY OF THE INVENTION

This invention relates in general to a method for determining the characteristics of cracks in an electrically conductive metal workpiece and, in particular, to a new and useful method wherein a pair of the voltage probes is located between a pair of current probes in respect to the article to be measured and the measurement is made on the basis of the minimum potential difference detected by the voltage probes.

The method for the nondestructive determination of the existence, the depth and the length of cracks in an electrically conductive metal workpiece, such as a steel plate of a steel pipe, by means of and electric resistance measurement has been practiced for a long time. With this method it is usual to position a pair of voltage probes between two current probes which are brought into contact with a metal article to be inspected. A fixed DC current is passed through the pair of current probes and the voltage induced across the voltage probes is approximately proportional to the depth of a crack in the metal article to be measured. According to the prior art method of measurement based on such a principle, the potential difference between the pair of voltage probes is detected by means of a voltage measuring device. This measurement which is subsequently compared with a calibration for a simple measurement with a similar metal article without any crack, was arrived at on the basis of the maximum value in the measured voltage distribution. This means that the potential difference value is recorded when the crack is located in the middle of a pair of voltage probes. This potential difference is subjected to a large variation depending on the location of contact of the voltage probes relative to the crack, and, therefore, the method has a disadvantage because of the possibility of a considerably large measurement error.

In accordance with the present invention, the measurement of the defect in an electrically conductive metal workpiece is obtained by a measurement made on the basis of the minimum potential difference detected by the voltage probes.

Accordingly, it is an object of the invention to provide an improved method for measuring defects in an electrically conductive metal workpiece by means of an electrical resistance measurement which is characterized by the use of a pair of voltage probes located between a pair of current probes which are connected to a DC current source and wherein, if a defect is located between the current probes and the voltage probes the measurement is made on the basis of the minimum potential difference detected by the voltage probes.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 4 is a curve similar to FIG. 3 in which the method of the invention is applied to a nozzle of a forced circulation coolant water outlet of a pressurized vessel for an atomic pile; and FIG. 5 is a table obtained by the curve of FIG. 2 in respect to a test piece consisting of the same material as the pressurized vessel for the atomic pile.

GENERAL DESCRIPTION OF THE PREFERRED EMBODIMENTS

Figure 1:
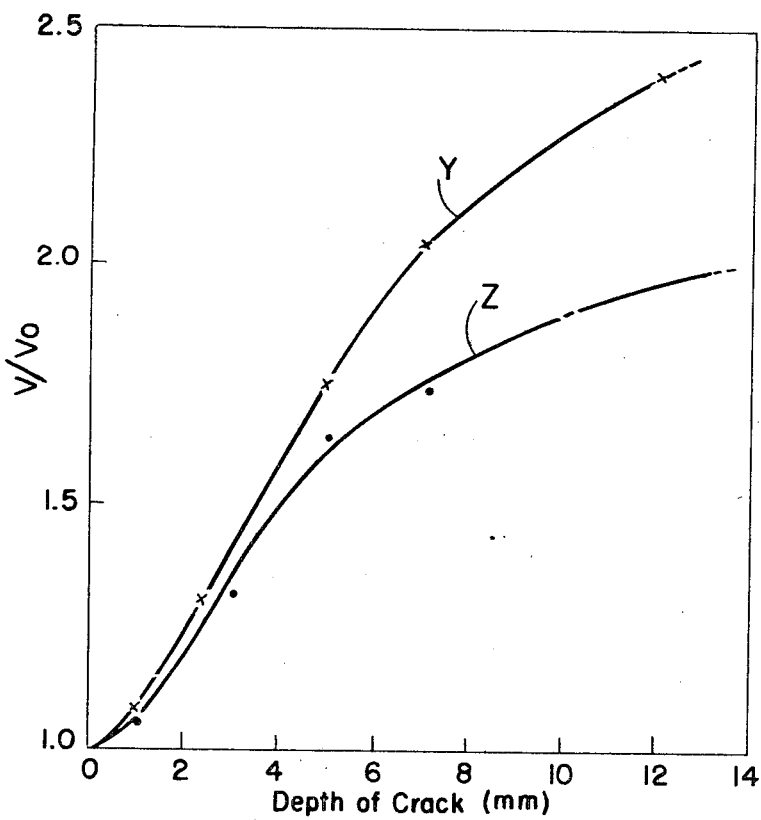
FIG. 1 is a diagram of the calibration curves for the method of measurement of the characteristics of a crack in an electrically conductive workpiece as carried out in accordance with the prior art.

According to the prior art method of measurement of the characteristics of cracks in an electrically conductive workpiece, such as a steel plate or a steel pipe, by means of an electric resistance measurement, the maximum value of the measured voltage distribution is recorded to and calibrations for such a method are indicated in FIG. 1. To achieve these results, an electric resistance type of nondestructive inspector is employed which comprises a pair of current probes provided on a support frame (not shown) at suitable intervals and another pair of voltage probes provided on the same support frame between the pair of current probes. A potential source is connected across the terminals of the current probes and the voltage measuring device is connected across the terminals of the voltage probes. After the tips of the respective probes of the inspector have been brought into contact with the portion of the workpiece which is to be measured, a fixed DC current is passed from the potential source and across the current probes through the electrically conductive workpiece to be measured. The potential difference between the pair of voltage probes is detected by means of the voltage measuring device. A calibration curve for the correlation between the potential difference and the depth of crack is preliminarily prepared by means of a test piece of the same material having a crack of known depth as indicated in FIG. 1. Thus the depth of crack is read out from a potential difference on the calibration curve corresponding to the detected voltage difference. The calibration curves indicated in FIG. 1, referred to a test piece of SB–46 steel (JIS: Japanese Industrial Standard) and a test piece of A 302 B material (ASTM) padded with SUS–27 (JIS: Japanese Industrial Standard) by welding. The ratio of V/Vo is represented along the ordinate, wherein Vo represents a potential difference when no defect such as a crack exist in the test piece and V represents a potential difference when there is a defect. The abscissa of the curve measures the depth of crack in millimeters. The curve Y shows a calibration curve for SB–46 steel while the curve Z shows a calibration curve for the curved steel padded with SUS-27 by welding.

In the prior art method shown in FIG. 1 the potential difference detected by the pair of voltage probes is measured on the basis of the maximum value in the measured voltage distribution; that is, the potential difference value when the crack is located in the middle of the pair of voltage probes. This potential difference is subjected to a large variation which depends upon the location of contact of the voltage probes relative to the crack. Therefore, the method of the prior art has the disadvantage that due to the considerably large measuring error it is less reliable.

In accordance with the present invention, various tests and researches have indicated that the potential difference detected when the crack in the workpiece to be measured is located between the current probe and the voltage probe that is, the minimum potential difference, is substantially constant regardless of the location of the crack between the both probes. Consequently, the measurement error is small and an improved result is obtained when the minumum potential difference is measured.

Figure 2:
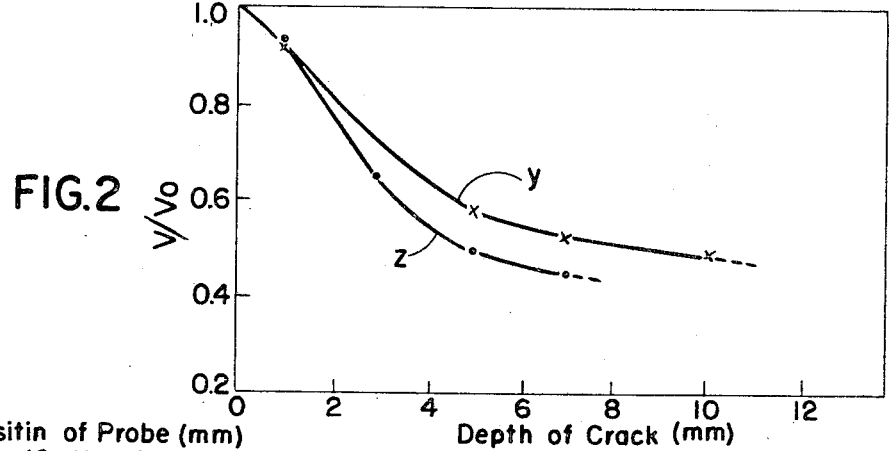
FIG. 2 is a diagram of a calibration curve for the method of measurement of the characteristics of a crack in an electrically conductive workpiece in accordance with the invention.

In the method of the invention, indicated on the curve of FIG. 2, there are shown calibration curves y and z which are prepared in accordance with the method of the invention and which show the relation of the potential difference when a crack exists between the current probe and the voltage probe. These curves show the minumum potential difference versus the depth of the defect with respect to a test piece of SB–46 steel and a test piece of A 302 B material padded with SUS–27 by welding, designated by the letter z.

Figure 3:
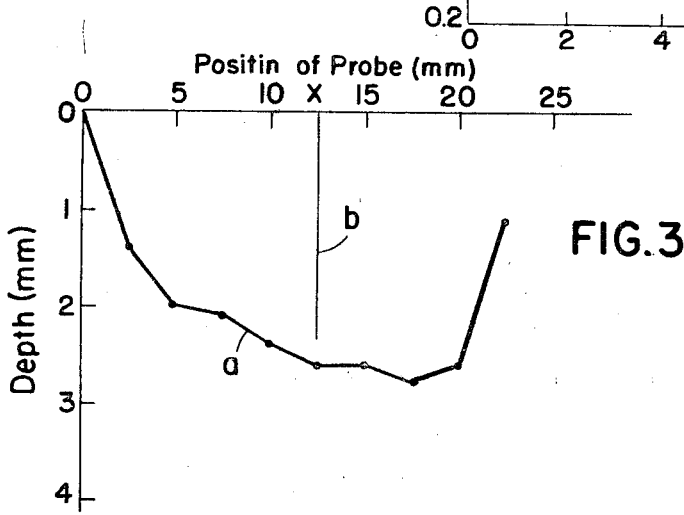
FIG. 3 is a curve indicating a measurement according to the method of the invention.

In the curve indicated in FIG. 3, the method according to the present invention was carried out with respect to a test piece of carbon steel of 55 mm. in thickness which had a surface padded with SUS–27 of 6 mm. in thickness by welding. The position of the measured portion is shown as the abscissa and the depth of the crack is shown as the ordinate. In this FIG., the line or curve $a$ was achieved by connecting the points indicating the measured values of the depth of crack at the respective positions of the measured portions. The line $b$ represents the depth of crack obtained by cutting out the point at the location X of the measured portion in order to directly measure the depth. The experimental results show that the directly measured value of the crack and the measured value achieved according to the method of the invention are approximately the same and that the error is very small.

In the diagram indicated in FIG. 4, the method of the present invention was applied to a measurement of a nozzle portion of a forced circulation coolant water outlet of a pressure vessel for an atomic pile. From this same data, the table of FIG. 5 was achieve by interpreting the curve $z$ in FIG. 2 which is the calibration curve with respect to a test piece consisting of the same material as the pressure vessel for the atomic pile. As can be seen from the table of FIG. 5, according to the present invention, the defects of the workpiece to be measured, such as the existence, the location, the depth, the length, etc., of the cracks can be determined with high precision. In FIG. 5 the mm. in the second column represents the distance, in the radial direction, measured from a point on the 80° line in FIG. 4. In the illustrated example, the radial distance between the center of FIG. 4 and the 80° line is 140.5 mm.

In summary the present invention is characterized by the making of a measurement on the basis of the minimum potential difference detected between the voltage probes. The method is an industrially advantageous invention since it enable the precise determination of the existence, location, depth, length, etc., of the defects such as cracks or flaws in an electrically conductive workpiece.

What is claimed is:

1. A method for measuring defects in an electrically conductive workpiece using an electrical resistance measurement wherein a pair of voltage probes are employed between a pair of current probes which are connected to a source of direct current and applied to the workpiece to be measured, comprising applying the current through the current probes to the workpiece to be measured and, when a defect is located by the current probes and the voltage probes, making a measurement of the voltage on the basis of the minimum potential difference detected by the voltage probes.

* * * * *